(12) United States Patent
Smyers (10) Patent No.: US 8,135,724 B2
(45) Date of Patent: Mar. 13, 2012

(54) DIGITAL MEDIA RECASTING

(75) Inventor: Scott Smyers, Los Gatos, CA (US)

(73) Assignees: Sony Corporation, Tokyo (JP); Sony Electronics Inc, Parkridge, NJ (US)

( * ) Notice: Subject to any disclaimer, the term of this patent is extended or adjusted under 35 U.S.C. 154(b) by 417 days.

(21) Appl. No.: 11/947,604

(22) Filed: Nov. 29, 2007

(65) Prior Publication Data

US 2009/0143881 A1 Jun. 4, 2009

(51) Int. Cl.
    G06F 17/30 (2006.01)
(52) U.S. Cl. ........ 707/756; 707/758; 382/229; 382/181; 348/592
(58) Field of Classification Search .............. 707/7, 610, 707/611, 626, 803, 60, 757, 758, 756; 348/592, 348/231.99; 709/246; 386/46; 725/32; 345/619
See application file for complete search history.

(56) References Cited

U.S. PATENT DOCUMENTS

| | | | | |
|---|---|---|---|---|
| 5,959,717 | A * | 9/1999 | Chaum | 352/40 |
| 6,195,497 | B1 * | 2/2001 | Nagasaka et al. | 386/46 |
| 6,597,368 | B1 * | 7/2003 | Arai et al. | 345/646 |
| 6,804,683 | B1 * | 10/2004 | Matsuzaki et al. | 1/1 |
| 7,221,800 | B2 * | 5/2007 | Sesek et al. | 382/229 |
| 7,302,118 | B2 * | 11/2007 | Liu et al. | 382/306 |
| 7,528,890 | B2 * | 5/2009 | Staker et al. | 348/592 |
| 7,773,770 | B2 * | 8/2010 | Evans et al. | 382/100 |
| 2002/0112249 | A1 * | 8/2002 | Hendricks et al. | 725/136 |
| 2004/0015608 | A1 * | 1/2004 | Ellis et al. | 709/246 |
| 2004/0194127 | A1 * | 9/2004 | Patton et al. | 725/32 |
| 2004/0201749 | A1 * | 10/2004 | Malloy Desormeaux | 348/231.99 |
| 2005/0047682 | A1 * | 3/2005 | Stevens et al. | 382/306 |
| 2007/0132780 | A1 | 6/2007 | Garbow et al. | |
| 2007/0136745 | A1 | 6/2007 | Garbow et al. | |
| 2007/0234214 | A1 * | 10/2007 | Lovejoy et al. | 715/719 |
| 2008/0196059 | A1 * | 8/2008 | Evans et al. | 725/32 |
| 2009/0002391 | A1 * | 1/2009 | Williamson et al. | 345/619 |

FOREIGN PATENT DOCUMENTS

| | | |
|---|---|---|
| KR | 4067563 A | 7/2004 |
| WO | WO0137216 A2 | 5/2001 |

OTHER PUBLICATIONS

Yoostar. Starring Yoo. obtained at "http://www.yoostar.com".
Yoostar. Starring Yoo. obtained at "http://www.yoostar.com/how_it_works.html"; 'Set up' tab selected.
Yoostar. Starring Yoo. obtained at "http://www.yoostar.com/how_it_works.html"; 'Pick your Role' tab selected.

(Continued)

*Primary Examiner* — Sherief Badawi
(74) *Attorney, Agent, or Firm* — Trellis IP Law Group, PC (57) ABSTRACT

In one embodiment, a method of tagging content can include: accessing a frame of a digital media production; identifying an object for tagging within the frame; defining a metadata tag for the object; and storing the metadata tag in association with the identified object and the frame in the digital media production. In one embodiment, a method of substituting content can include: receiving tagged digital media in a controller; identifying an object for substitution by searching through objects and metadata tags in the tagged digital media; retrieving a substitute object using the controller; and re-rendering the tagged digital media to produce a customized digital media using the substitute object in place of the identified object.

20 Claims, 5 Drawing Sheets

OTHER PUBLICATIONS

Yoostar. Starring Yoo. obtained at "http://www.yoostar.com/how_it_works.html"; 'Shoot' tab selected.

Yoostar. Starring Yoo. obtained at "http://www.yoostar.com/how_it_works.html"; 'Share' tab selected.

* cited by examiner

DIGITAL MEDIA RECASTING

BACKGROUND

Particular embodiments generally relate to digital media, and more specifically to modifying digital media productions.

Commercial content or digital media productions typically contain a number of objects, such as characters or background scenery in frames of an animated video. Some digital media allows for replacement within presentations by way of personalized rulesets, while others allow entity attribute modification, such as in video game applications. However, these approaches are fairly restrictive.

SUMMARY

In one embodiment, a method of tagging content can include: accessing a frame of a digital media production; identifying an object for tagging within the frame; defining a metadata tag for the object; and storing the metadata tag in association with the identified object and the frame in the digital media production.

In one embodiment, a method of substituting content can include: receiving tagged digital media in a controller; identifying an object for substitution by searching through objects and metadata tags in the tagged digital media; retrieving a substitute object using the controller; and re-rendering the tagged digital media to produce a customized digital media using the substitute object in place of the identified object.

A further understanding of the nature and the advantages of particular embodiments disclosed herein may be realized by reference of the remaining portions of the specification and the attached drawings.

DETAILED DESCRIPTION OF EMBODIMENTS

Particular embodiments provide an approach for facilitating the substitution of user-defined objects (e.g., images of real people, voices, landscapes, environments, etc.) into existing audio/video, or any suitable digital media. Such substitution may be facilitated by tagging content in the original digital media with information (e.g., dimensions and geographic orientations of objects through time) to optimize for such purposes through mastering or post-processing. This allows a user to substitute the objects in the digital media with user-defined objects. Thus, the substituted objects may be presented in the digital media in accordance with the tagged information.

Figure 1:
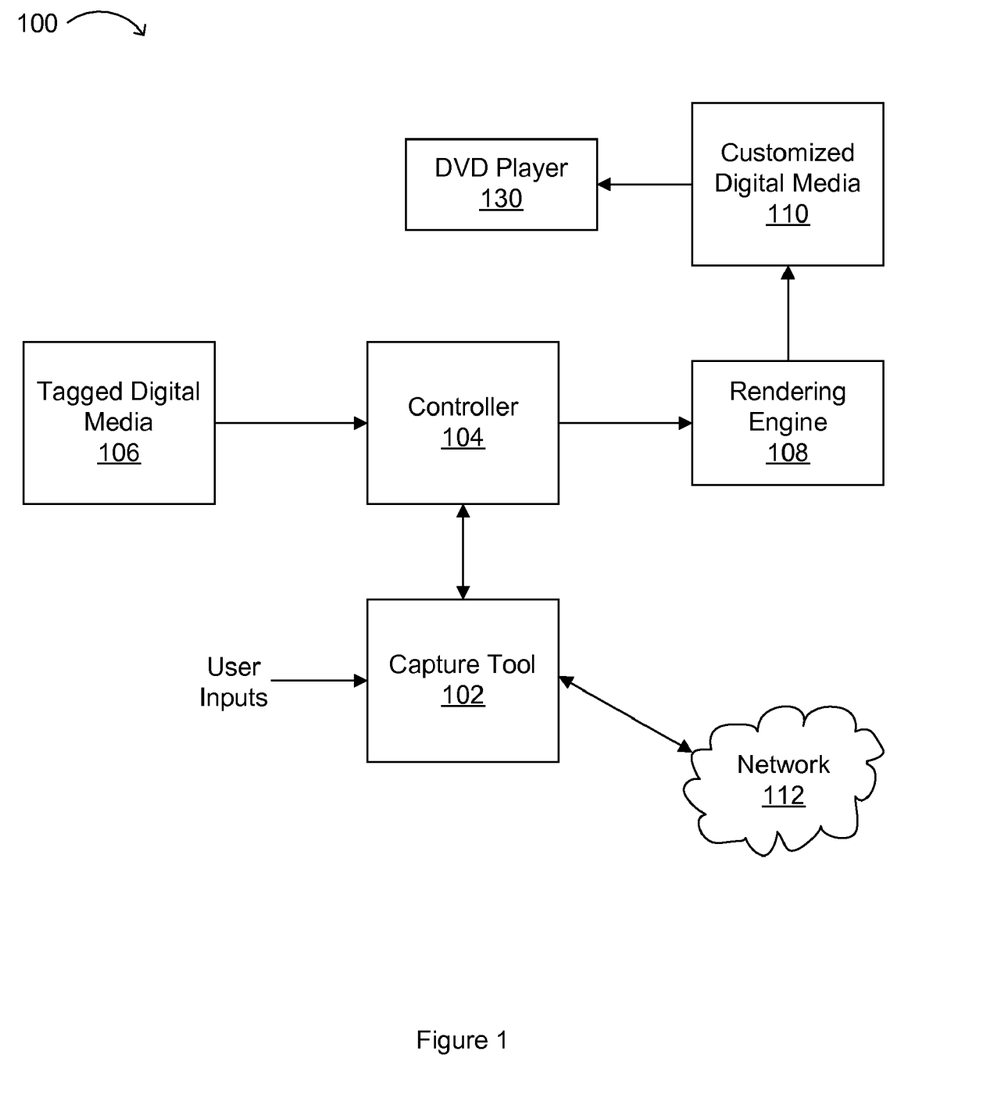
FIG. 1 illustrates an example digital media recasting system in accordance with embodiments of the present invention.

Referring now to FIG. 1, an example digital media recasting system 100 in accordance with embodiments of the present invention is shown. Controller 104 can receive capture tool 102 and tagged digital media 106 inputs to facilitate searching of tags for identification of an object for substitution. Tagged digital media 106 may be a commercial release, and can include photos, audio files, videos, virtual reality representations, animations, or any other suitable media form or content. Capture tool 102 can include a user interface for receiving substitute data or objects directly from a user. Alternatively or in addition, network 112 (e.g., the Internet, a virtual private network (VPN), etc.) can be utilized to access a substitute object and/or user input.

Rendering engine 108 can re-render a substitute portion or object from tagged digital media 106, to provide customized digital media 110. Further, a user may view the resulting customized digital media on any suitable player, such as a personal computer, cellular phone, game system display (e.g., PS3), laptop computer, digital camera, digital television (DTV), or any other computing and/or display device. Further, capture tool 102 can be part of a client computer, while other processing engines (e.g., controller 104, rendering engine 108, etc.) may be part of a server that communicates through a network (e.g., network 112). For example, customized digital media 110 is a digital video disc (DVD) that may be input to DVD player 130 for viewing.

Certain embodiments provide tools to allow a consumer to capture images (e.g., via capture tool 102) and/or videos of objects for purposes of substituting them into a commercial digital media product to create a new customized product (e.g., substituting an image of "dad" in place of Shrek in an animation). The capture tools may capture video and/or metadata, and can also reference information (e.g., orientation, offsets, etc.) found in tags associated with objects in the commercial digital media production (e.g., tagged digital media 106) for purposes of guiding the user through the capture process. Physical dimensions of objects can also be scaled to the target, such as by making dad the mouse (relatively small), and making the son into Shrek (relatively large). The actual substitution may also be done off-line and post-purchase (e.g., using a PS3 or other computing device).

During capture (e.g., via capture tool 102, and in conjunction with controller 104), a substitute object may be isolated and tagged with comparable metadata (e.g., orientation, offsets etc.). Such tags may be matched at the time of re-rendering (e.g., via rendering engine 108) such that orientation and other information of the substitute object are correlated with that of the original object (e.g., from tagged digital media 106). In some cases, some interpolation may be needed to precisely match these parameters.

For example, a face or voice file can be input into the produced picture or digital media by mapping to a polygon model that is found in a metadata tag. As a result, a new and customized version of the produced picture can be created, and possibly sold, or otherwise distributed (e.g., via the Internet). A user interface can be accessed via capture tool 102, where the user can add a face (e.g., image, video, etc.) or other substitute object (e.g., using a memory stick or other storage device to provide a picture or pictures covering appropriate types or angles/shots), and select which character/object in the digital media is to be replaced (e.g., by searching through metadata tags).

Figure 2:
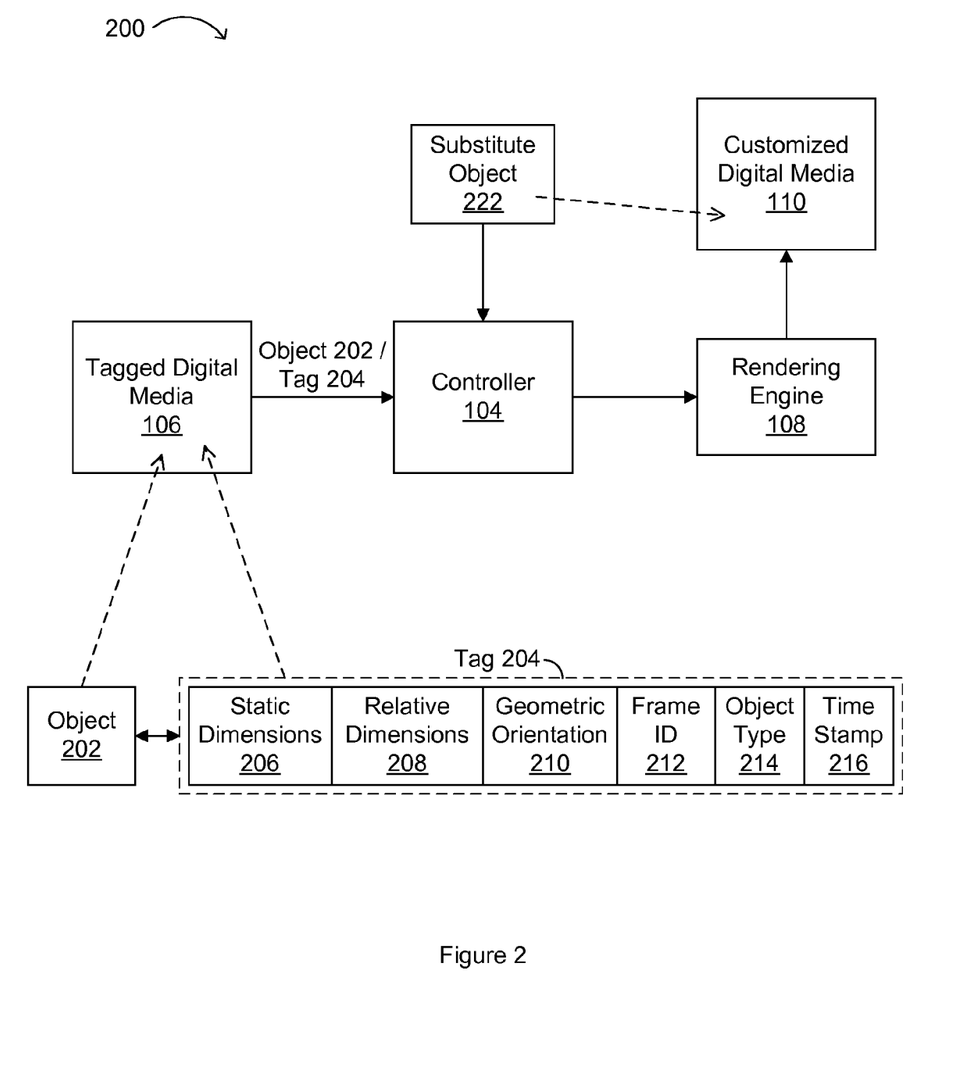
FIG. 2 illustrates an example digital media recasting system with example object and tag structures in accordance with embodiments of the present invention.

Referring now to FIG. 2, an example digital media recasting system 200 with example object and tag structures in accordance with embodiments of the present invention is shown. Tagged digital media 106 can include any number of media objects 202. In certain embodiments, one or more of such objects 202 is coupled to and stored in association with a corresponding tag 204. Tag 204 can include any number of suitable data fields, such as static dimensions 206, relative dimensions 208, geometric orientation 210, frame identification 212, object type 214, and time stamp 216. Thus, a polygon model with time variables can be supported by tag 204. In this fashion, tag 204 can convey sufficient information or metadata related to object 202 for enabling substitution of a user-provided object in place of object 202. Further, substitute object 222 can be provided by capture tool 102 along with references or mapping to one or more fields of tag 204.

Professional movies (e.g., Shrek) may be tagged during creation with information about the characters, general objects, and background scenery (e.g., houses). This tagging can include static dimensions, relative dimensions, and geometric orientation of each object through time. Most of this information is available during the production of computer animated movies, so additional work associated with particular embodiments is to incorporate this already available information into the commercial release, or a special version thereof, as metadata tags. For example, Blu-ray™ media, by virtue of its larger storage capacity, can accommodate storing this additional information in the digital media content.

Figure 3:
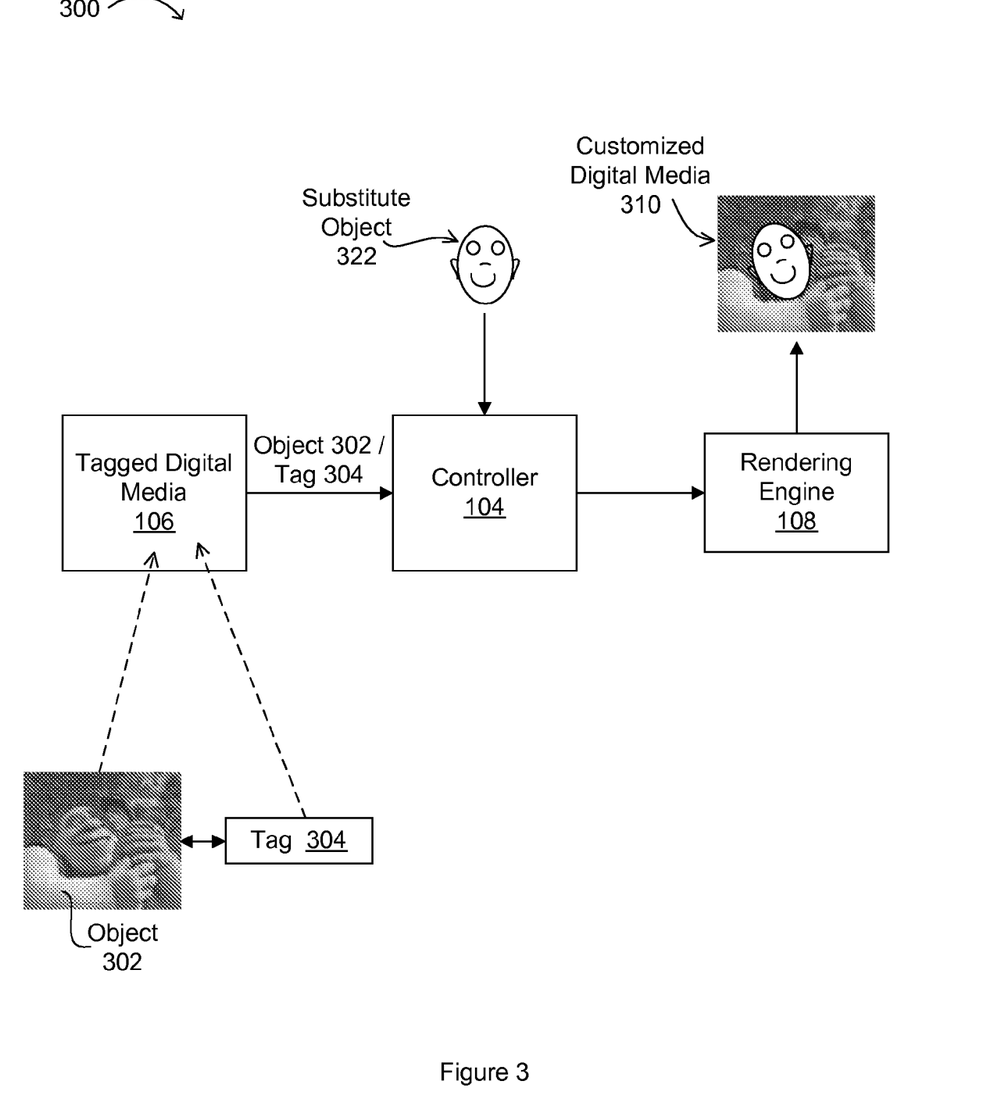
FIG. 3 illustrates an example of customized digital media in accordance with embodiments of the present invention.

Referring now to FIG. 3, an example of customized digital media 300 in accordance with embodiments of the present invention is shown. In this particular example, object 302 may be an image of Shrek, where the movie Shrek has been tagged to form tagged digital media 106. Tag 304 can be associated with object 302, and tag 304 can include an object type of image file, frame identification, time stamps, as well as various dimensions and orientations of the particular features within the image. Object 302 and tag 304 can be sent to controller 104 during post-processing. Controller 104 can receive substitute object 322, which may be a digital photograph, image file, drawing file, video (tagged or not), or other animation. Rendering engine 108 can then place and re-render substitute object 322 over a face portion of object 302 by utilizing fields or other information contained in object identifiers derived from tag 304, to form customized digital media 310.

In this fashion, information about objects can be retained, and shapes of objects can be changed (e.g., substitution of another person's face over Shrek's). Computer models (e.g., 3-D polygon models) can be utilized with a rendering engine to re-render based on object substitution. However, an entire image need not be re-rendered, but rather only the substitute portion (e.g., a head/face), as shown. Thus in certain embodiments, movie versions with metadata tags are provided to users, and such movie versions can support an interface via tags to accommodate users entering images, etc., for substitution into a customized version of the movie. The interface can indicate which types of images (e.g., types of picture shots for a face replacement) would be needed for a complete substitution of an object in the movie. However, the rendering engine can also fill in missing data, such as by extrapolating or interpolating from surrounding data or images.

Figure 4:
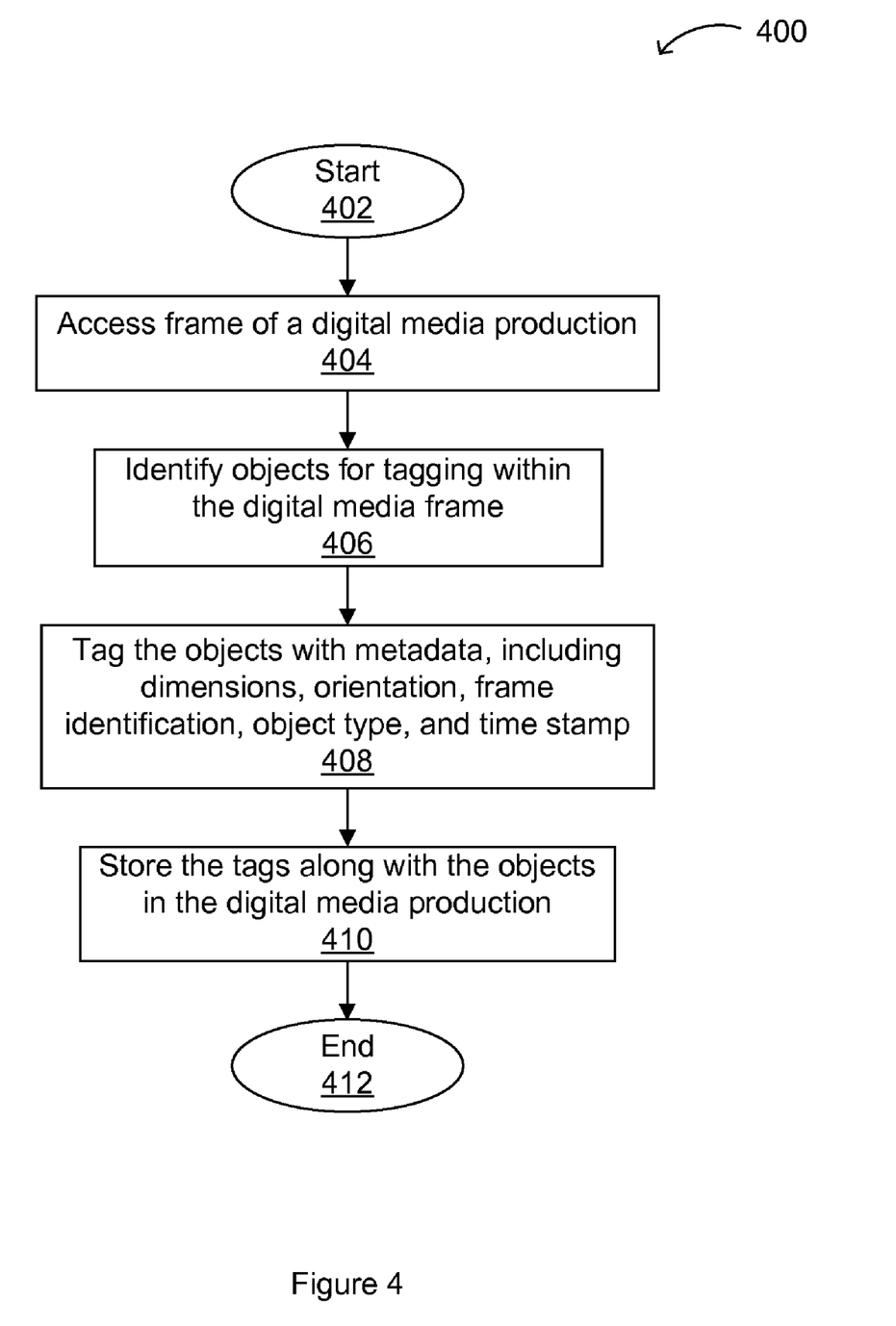
FIG. 4 is a flow diagram showing an example method of tagging objects in accordance with embodiments of the present invention.

Referring now to FIG. 4, a flow diagram of an example method of tagging objects 400 in accordance with embodiments of the present invention is shown. The flow can begin (402), and a frame within a digital media production can be accessed (404). Objects within the digital media frame can be identified for tagging (406). The identified objects can then be tagged with metadata, including dimensions, orientation, frame identification, object type, and time stamp (408), as discussed above. The metadata tags can then be stored along with the objects in the digital media production (410), completing the flow (412). Alternatively, tags can be generated during creation of content where per-frame tags are authored contemporaneously with the generated frame image itself.

In this fashion, particular embodiments can accommodate metadata tagging, where information is provided to facilitate changing objects (e.g., entering a new house image over house background originally provided in the production media). The result can be a movie where some or all of the objects found in the commercial release would be substituted for objects chosen by a user. Such a modified movie can then be stored on a user's hard drive, or otherwise distributed (e.g., via a social networking website over the Internet), or burned onto removable media, such as a DVD or Blu-ray Disc™.

Figure 5:
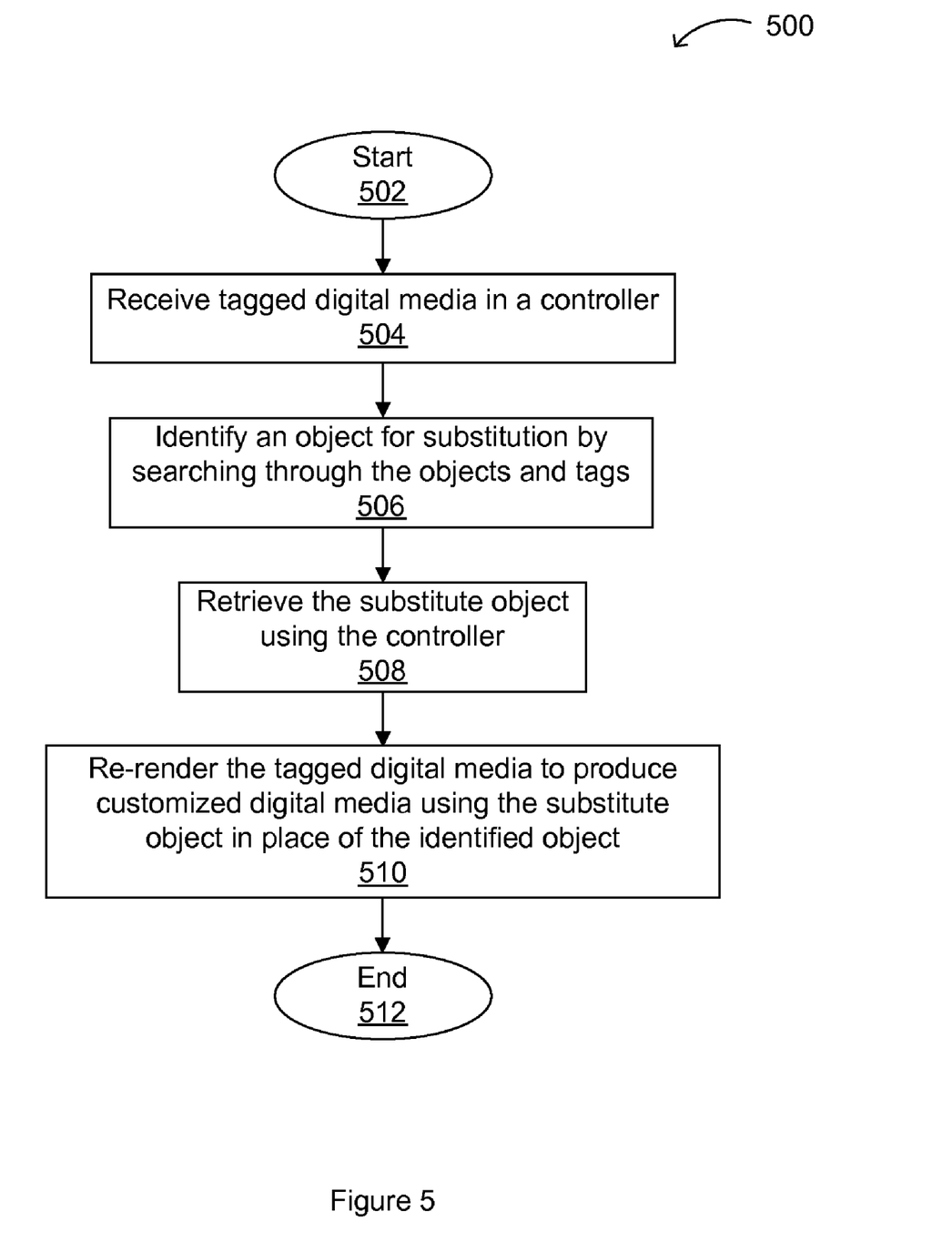
FIG. 5 is a flow diagram showing an example method of substituting objects in accordance with embodiments of the present invention.

Referring now to FIG. 5, a flow diagram of an example method of substituting objects 500 in accordance with embodiments of the present invention is shown. The flow can begin (502), and tagged digital media can be received in a controller (504). For example, the controller resides in or is accessible by a PS3 player. An object can then be identified for substitution by searching through the objects and tags (506). The substitute object can be retrieved by the controller (508). The tagged digital media can then be re-rendered to produce customized digital media using the substitute object in place of the identified object (510), thus completing the flow (512).

In this fashion, certain embodiments can thus provide an entertainment experience that includes features available in the professional arena for video production, bundling them together with specially mastered commercial content, and offering appropriate tools to the consumer as an entertainment-based product line.

Although the description has been described with respect to particular embodiments thereof, these particular embodiments are merely illustrative, and not restrictive. For example, while particular digital media examples have been used, any suitable media for conveying tagged content can also be used in particular embodiments. Also, music where vocals are tagged can similarly be replaced, as well as pictures where objects can be replaced, can also be accommodated in particular embodiments.

Any suitable programming language can be used to implement the routines of particular embodiments including C, C++, Java, assembly language, etc. Different programming techniques can be employed such as procedural or object oriented. The routines can execute on a single processing device, multiple processors, networked distributed processors, including the Internet, or otherwise. Although the steps, operations, or computations may be presented in a specific order, this order may be changed in different particular embodiments. In some particular embodiments, multiple steps shown as sequential in this specification can be performed at the same time.

A "computer-readable medium" for purposes of particular embodiments may be any medium that can contain and store the program for use by or in connection with the instruction execution system, apparatus, system, or device. The computer readable medium can be, by way of example only but not by limitation, a semiconductor system, apparatus, system, device, or computer memory. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method, comprising:
    displaying user interface controls on a display screen using instructions executed by a processor, wherein the processor is coupled to a user input device, the user interface controls being used for tagging digital media and capturing substitute objects;
    accepting a signal from the user input device to indicate operation of a capture tool for capturing a substitute object;
    accepting a signal from the user input device to select a digital media production for substitution of the substitute object, wherein the digital media production comprises a frame with objects, and wherein an identified object that is available for the substitution in the frame is tagged with a first metadata tag that is stored along with the identified object on the digital media production, wherein the first metadata tag comprises fields that indicate identification of the frame, a type of the identified object, static dimensions, relative dimensions, a time stamp, and geometric orientation to support a polygon model with time variables for the identified object, the time variables being associated with appearance of the identified object in one or more frames of the digital media production;
    accepting a signal from the user input device to capture the substitute object using the capture tool, wherein the capture of the substitute object comprises adding a second metadata tag for the substitute object, wherein the second metadata tag comprises fields that indicate for the substitute object, a type, static dimensions, relative dimensions, and geometric orientation;
    rendering customized digital media by substituting the substitute object for the identified object in the one or more frames of the digital media production by matching the second metadata tag for correlation to the polygon model from the first metadata tag; and
    providing the customized digital media for access by one or more users.

2. The method of claim 1, wherein the providing the customized digital media for access comprises distributing the customized digital media via a social networking website.

3. The method of claim 1, wherein the providing the customized digital media for access comprises posting the customized digital media on the Internet.

4. The method of claim 1, wherein the providing the customized digital media for access comprises storing the customized digital media on a tangible media.

5. The method of claim 1, wherein the capturing of the substitute object comprises using a digital camera.

6. The method of claim 1, wherein the capturing of the substitute object comprises receiving the substitute object from the capture tool via a network.

7. The method of claim 1, wherein the user interface controls are provided via a website on the Internet.

8. The method of claim 1, further comprising:
    accessing the frame from among a plurality of frames of the selected digital media production;
    selecting an object on the frame for tagging within the frame;
    defining the first metadata tag for the selected object; and
    storing the first metadata tag in association with the selected object and the frame on the selected digital media production to form a tagged digital media production.

9. The method of claim 8, wherein the substituting the substitute object for the identified object comprises:
    receiving the tagged digital media production in a controller;
    accessing the identified object for substitution by searching through a plurality of objects and first metadata tags in the tagged digital media production;
    retrieving the substitute object using the controller; and
    re-rendering the tagged digital media production to produce the customized digital media using the substitute object in place of the identified object by mapping to the polygon model from the first metadata tag.

10. The method of claim 1, wherein the rendering the customized digital media production comprises re-rendering only a portion of the digital media production corresponding to the substitute object.

11. The method of claim 9, further comprising:
    scaling dimensions of the substitute object to match corresponding dimensions of the identified object.

12. The method of claim 9, further comprising:
    interpolating dimensions and orientation of the substitute object to match corresponding dimensions and orientation of the identified object.

13. The method of claim 1, wherein the substitute object comprises a voice file.

14. The method of claim 1, wherein the polygon model comprises a three-dimensional polygon model.

15. The method of claim 9, wherein the identified object comprises a digital image.

16. The method of claim 9, wherein the identified object comprises an audio file.

17. The method of claim 9, wherein the identifying the object for substitution comprises using the user input device, the user input device being coupled to the controller.

18. The method of claim 9, wherein the retrieving the substitute object comprises using the user input device, the user input device being coupled to the controller.

19. A computer-readable storage device, comprising:
    one or more instructions for displaying user interface controls on a display screen using instructions executed by a processor, wherein the processor is coupled to a user input device, the user interface controls being used for tagging digital media and capturing substitute objects;

one or more instructions for accepting a signal from the user input device to indicate operation of a capture tool for capturing a substitute object;

one or more instructions for accepting a signal from the user input device to select a digital media production for substitution of the substitute object, wherein the digital media production comprises a frame with objects, and wherein an identified object that is available for the substitution in the frame is tagged with a first metadata tag that is stored along with the identified object on the digital media production, wherein the first metadata tag comprises fields that indicate identification of the frame, a type of the identified object, static dimensions, relative dimensions, a time stamp, and geometric orientation to support a polygon model with time variables for the identified object, the time variables being associated with appearance of the identified object in one or more frames of the digital media production;

one or more instructions for accepting a signal from the user input device to capture the substitute object using the capture tool, wherein the capture of the substitute object comprises adding a second metadata tag for the substitute object, wherein the second metadata tag comprises fields that indicate for the substitute object, a type, static dimensions, relative dimensions, and geometric orientation;

one or more instructions for rendering customized digital media by substituting the substitute object for the identified object in the one or more frames of the digital media production by matching the second metadata tag for correlation to the polygon model from the first metadata tag; and one or more instructions for providing the customized digital media for access by one or more users.

20. A content substitution system, comprising:

a display screen for displaying user interface controls using instructions executed by a processor, wherein the processor is coupled to a user input device, the user interface controls being used for tagging digital media and capturing substitute objects;

a capture tool for capturing a substitute object in response to a signal from the user input device, wherein the capture of the substitute object comprises adding a first metadata tag for the substitute object, wherein the first metadata tag comprises fields that indicate for the substitute object, a type, static dimensions, relative dimensions, and geometric orientation;

a controller for accepting a signal from the user input device to select a digital media production for substitution of the substitute object, wherein the digital media production comprises a frame with objects, and wherein an identified object that is available for the substitution in the frame is tagged with a second metadata tag that is stored along with the identified object on the digital media production, wherein the second metadata tag comprises fields that indicate identification of the frame, a type of the identified object, static dimensions, relative dimensions, a time stamp, and geometric orientation to support a polygon model with time variables for the identified object, the time variables being associated with appearance of the identified object in one or more frames of the digital media production;

a rendering engine coupled to the controller, the rendering engine being for rendering customized digital media by substituting the substitute object for the identified object in the one or more frames of the digital media production by matching the first metadata tag for correlation to the polygon model from the second metadata tag; and tangible media and a network for providing access to the customized digital media by one or more users.

* * * * *